Figure 1:
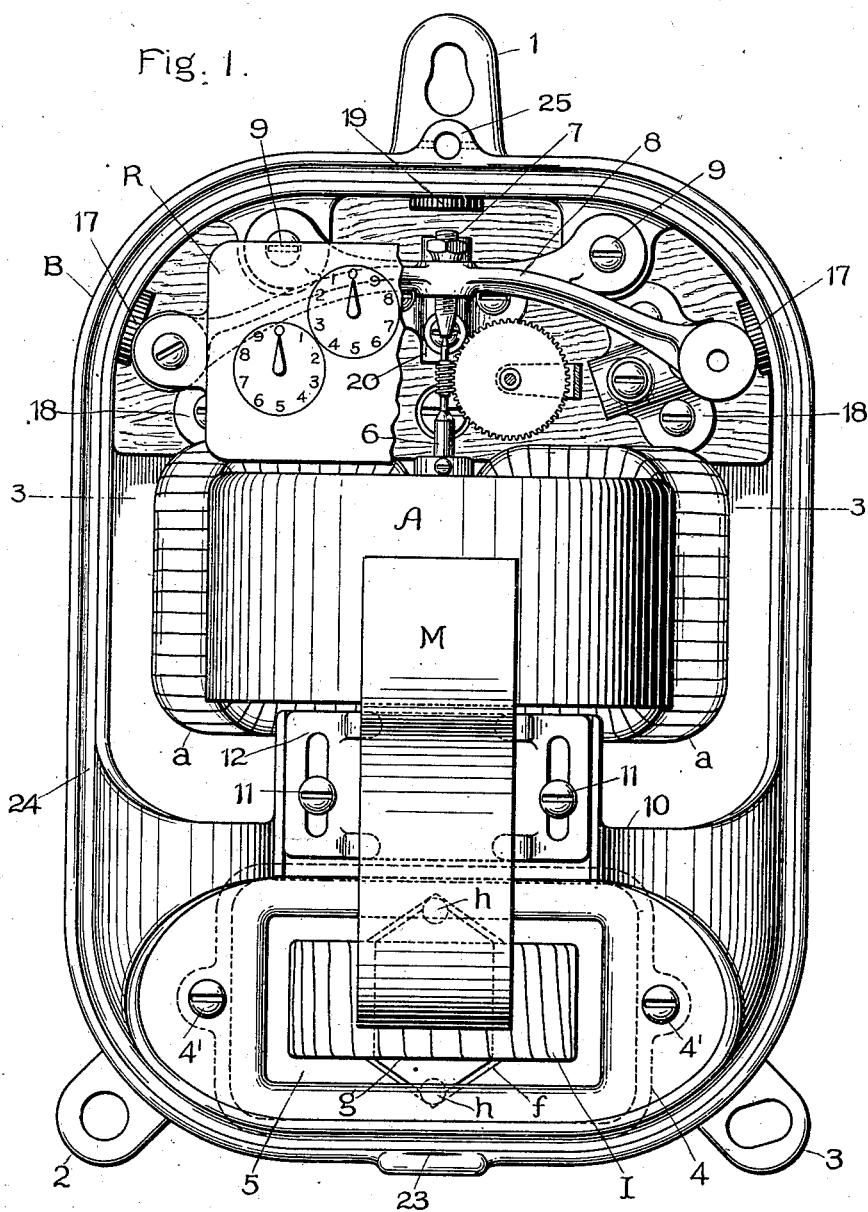

No. 671,282. Patented Apr. 2, 1901.
E. J. KING.
ELECTRIC METER.
(Application filed Jan. 20, 1900.)
(No Model.) 5 Sheets—Sheet 1.

Witnesses:
Lewis DeAbell
Benjamin B. Hull

Inventor:
Elton J. King.
by Albert G. Davis
Atty.

No. 671,282.  
E. J. KING.  
ELECTRIC METER.  
(Application filed Jan. 20, 1900.)  
Patented Apr. 2, 1901.

(No Model.) 5 Sheets—Sheet 2.

Witnesses:  
Lewis E Abell  
Benjamin B. Hull

Inventor  
Elton J. King.  
by Albert G. Davis  
Atty.

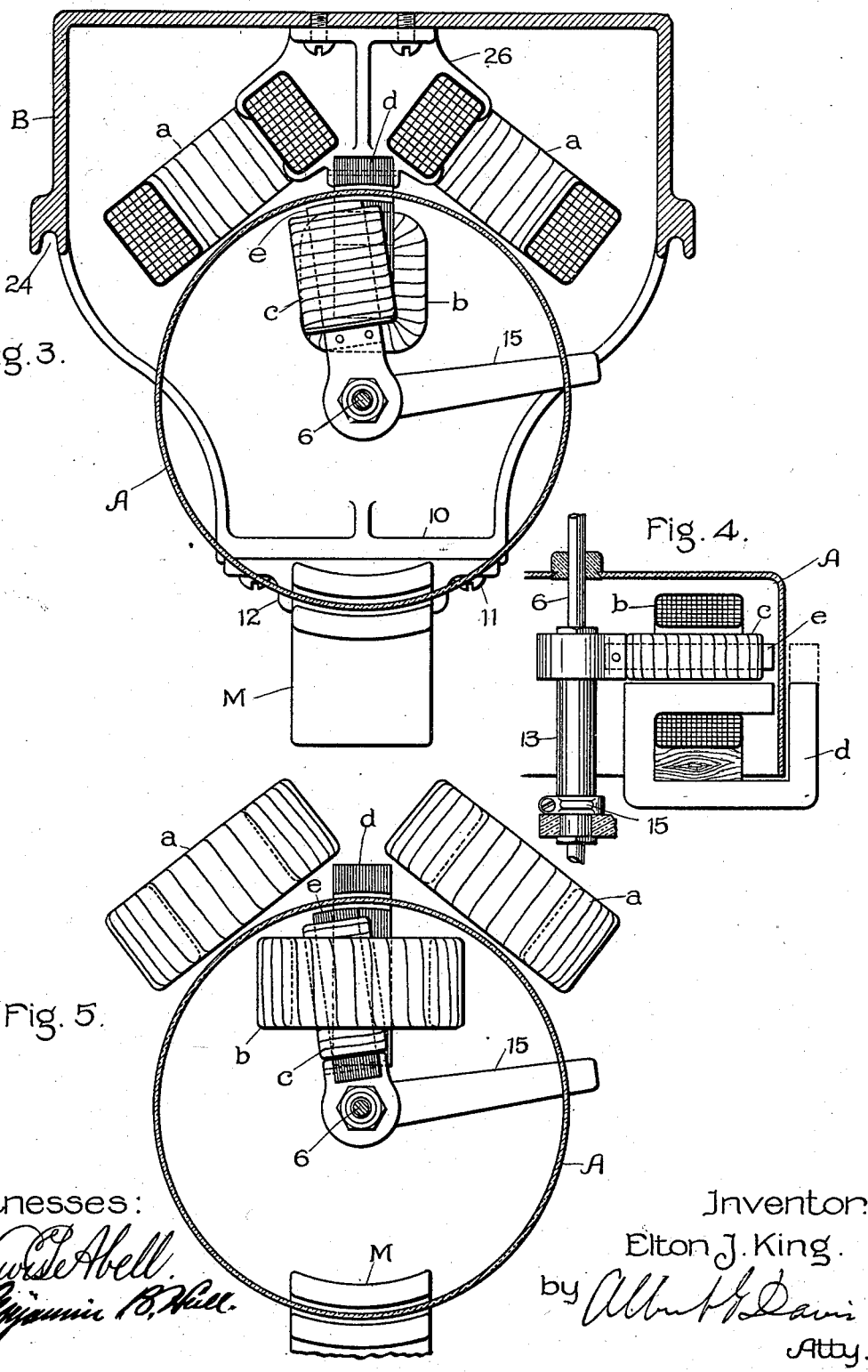

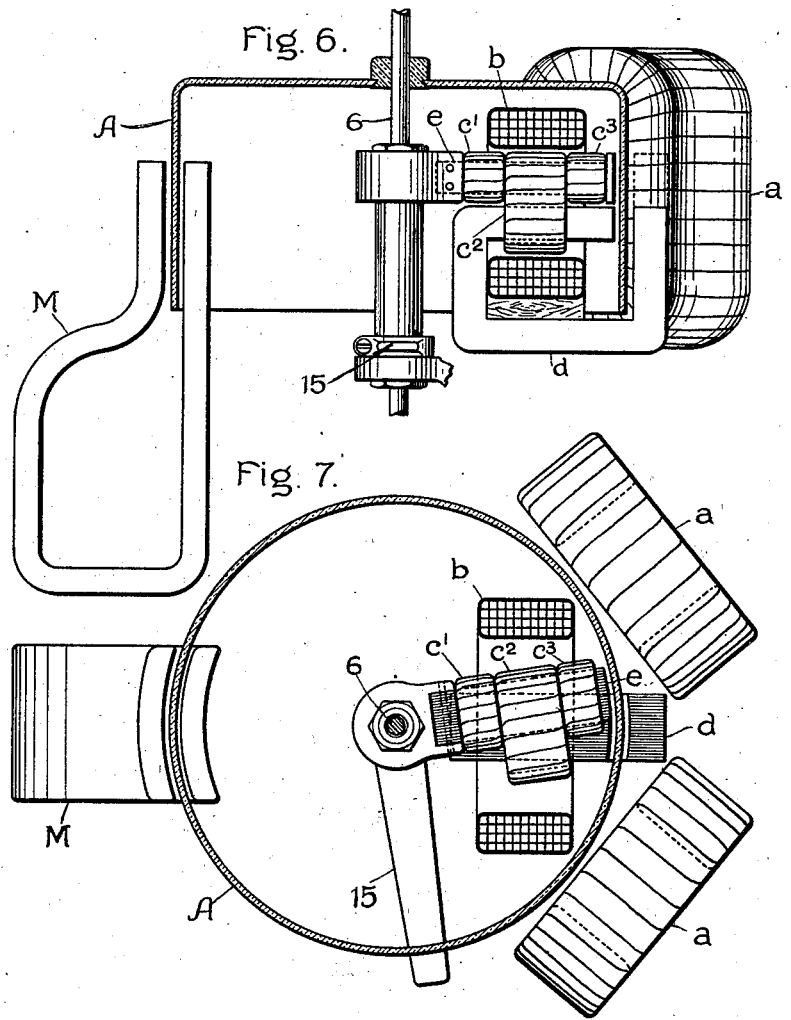

No. 671,282.　　　　　　　　　　　　　　　　　　　　　Patented Apr. 2, 1901.
E. J. KING.
ELECTRIC METER.
(Application filed Jan. 20, 1900.)
(No Model.)　　　　　　　　　　　　　　　　　　　　　5 Sheets—Sheet 5.
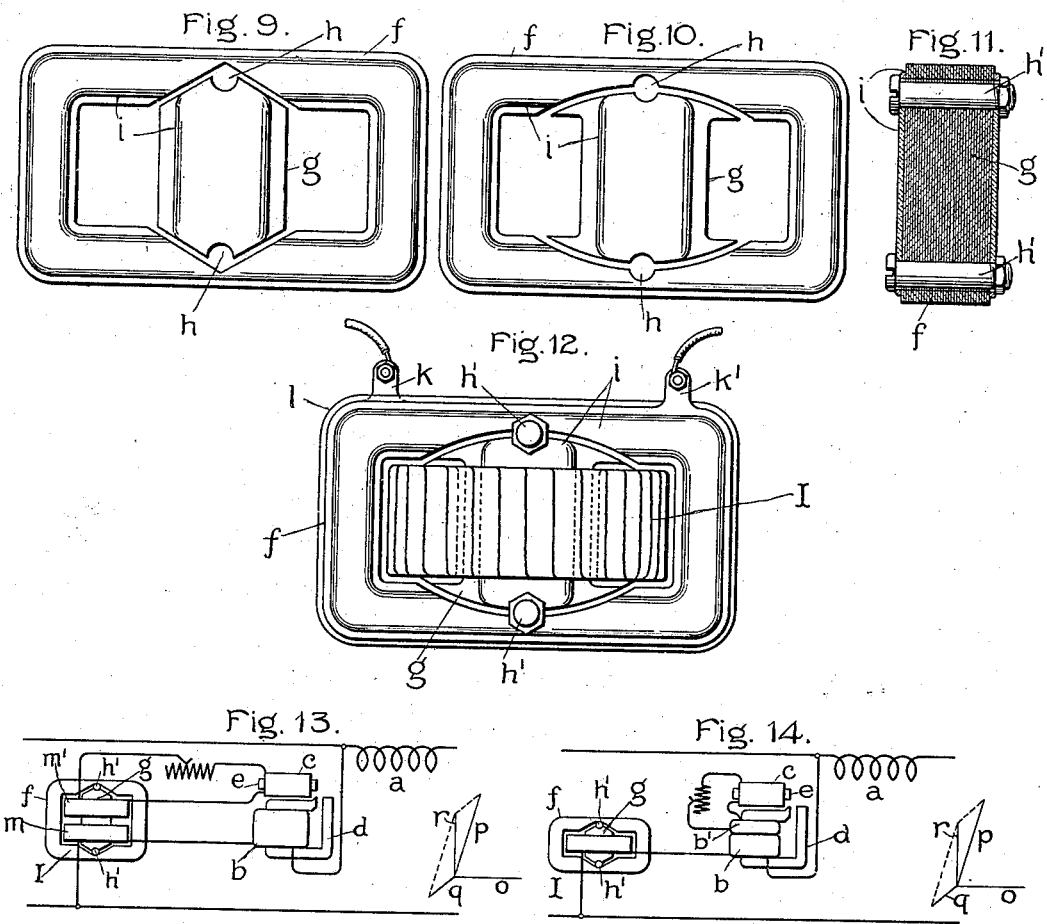
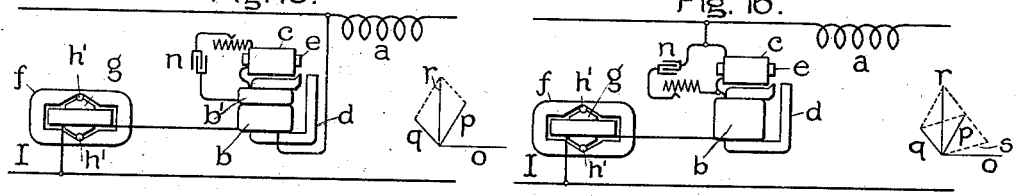
Witnesses:　　　　　　　　　　　　　　　　　　　　　Inventor:
Lewis E. Abell.　　　　　　　　　　　　　　　　　　Elton J. King,
Benjamin B. Hull.　　　　　　　　　　　　　　　　　　by
　　　　　　　　　　　　　　　　　　　　　　　　　Albert G. Davis.
　　　　　　　　　　　　　　　　　　　　　　　　　　　　Atty
THE NORRIS PETERS CO., PHOTO-LITHO., WASHINGTON, D. C.

UNITED STATES PATENT OFFICE.

ELTON J. KING, OF FORT WAYNE, INDIANA, ASSIGNOR TO THE GENERAL ELECTRIC COMPANY, OF NEW YORK.

ELECTRIC METER.

SPECIFICATION forming part of Letters Patent No. 671,282, dated April 2, 1901.

Application filed January 20, 1900. Serial No. 2,117. (No model.)

*To all whom it may concern:*

Be it known that I, ELTON J. KING, a citizen of the United States, residing at Fort Wayne, county of Allen, State of Indiana, have invented certain new and useful Improvements in Electric Meters, (Case No. 1,490,) of which the following is a specification.

My invention relates to improvements in alternating-current meters, and is particularly adapted to meters for measuring the energy consumed in an alternating-current circuit. In my description I shall refer to meters suitable for measuring the energy of single-phase alternating currents, the armature of the meter being of the low-resistance type, such as an aluminium or copper cylinder or disk; but it is evident that my improvements are not confined to meters of the single-phase type, since by suitable modifications well known in the art they may be applied to the measurement of energy in multiphase circuits.

One of the objects of my invention is to provide a motor-meter of the induction type that is simple and cheap in construction and compact and convenient to install and handle.

Another feature of my invention consists in producing a meter which will register accurately the actual energy consumed as well on inductive as on non-inductive loads and which is at the same time capable of adjustment for varying amounts of friction without affecting the accuracy of registration. To this end I provide the meter with a plurality of shunt-windings adjustable with respect to each other and supplied with currents differing in phase by such an amount that the action of the several shunt-coils, in conjunction with the series coil or coils, shall produce on the armature the same effect as would be produced by a single shunt-winding supplied with current displaced in phase by ninety degrees from the electromotive force of the circuit in which the meter is included. By so dividing the shunt-field and rendering the several shunt-coils relatively adjustable I am enabled to give the meter an initial starting torque due to the shunt-windings alone and to adjust this torque by adjusting the angular displacement of the several shunt-windings until it is just sufficient to compensate for the friction of the meter without changing the magnitude or the phase relation of the components of the shunt-field.

My invention consists also in certain details of construction hereinafter described, and more fully pointed out in the claims.

Figure 2:
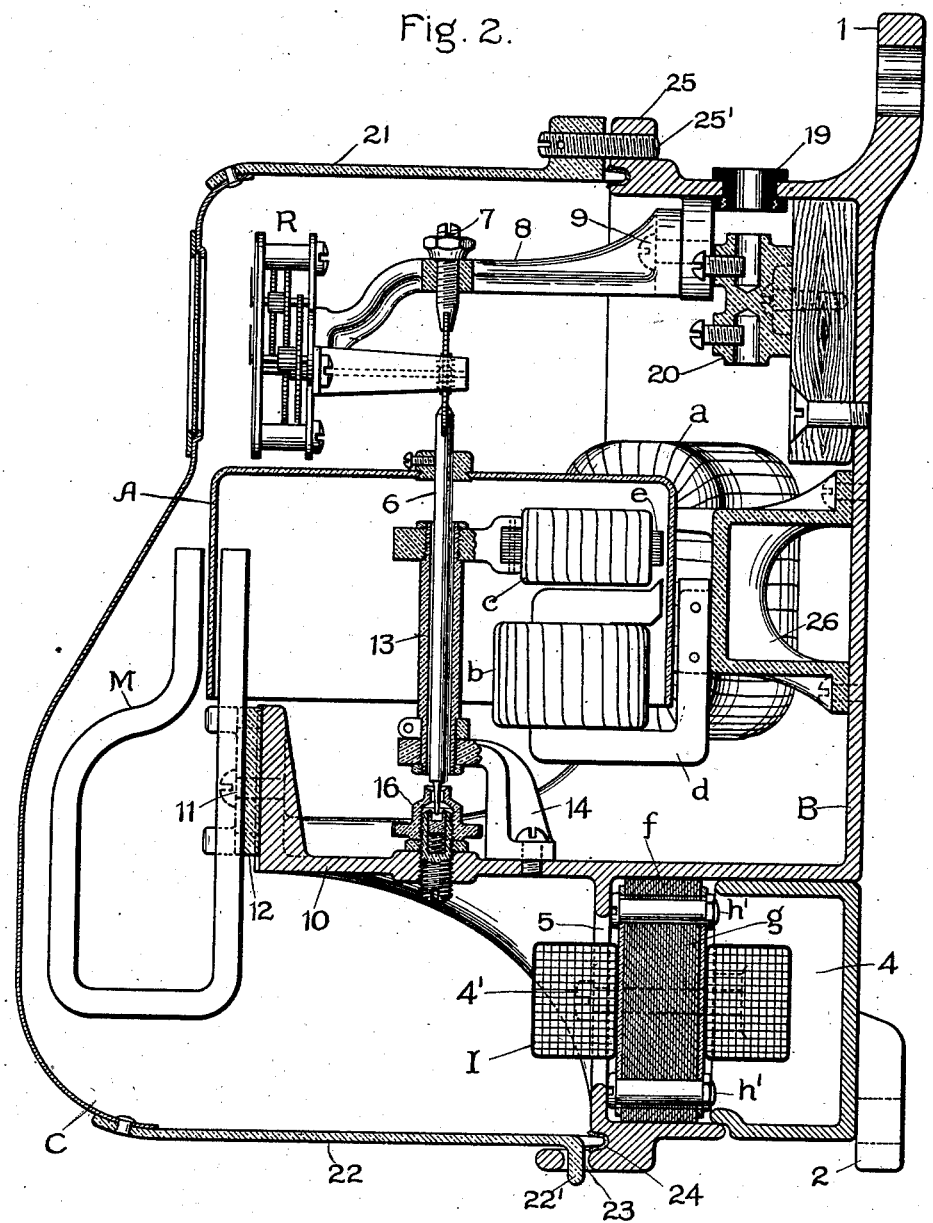

In the drawings, Figure 1 is a front elevation of my improved meter, showing the base or frame with the operative parts mounted thereon and with the cover removed. Fig. 2 is a vertical section through the meter, the cover being shown in position. Fig. 3 is a view in cross-section along the line 3 3 of Fig. 1. Figs. 4 to 7, inclusive, illustrate modifications of the arrangement of the shunt-coils. Fig. 8 illustrates one of the features of my invention as applied to a meter of the disk type. Figs. 9 to 11, inclusive, relate to an improved construction of the inductance-coil. Fig. 12 shows a combined inductance-coil and condenser. Figs. 13 to 17, inclusive, are diagrams illustrating certain features of my invention.

Referring to Figs. 1 and 2, the operative parts of the meter are shown mounted on a metallic base B, which is provided with three supports or eyes 1, 2, and 3 for mounting or securing the frame to a perpendicular support. To assist in installing, the eye 3 is slotted, the slot being along the arc of a circle from 1 as a center. The lower part of the frame B is recessed and the front wall of the recessed portion is provided with an aperture 5 to receive the winding of an inductance-coil I, which projects through said aperture into the interior of the meter-casing. The inductance-coil is secured in position by a clamping part 4, which surrounds and incloses the winding of the coil and clamps the core of the same against the frame of the meter. This clamp is held in position by the screws 4' 4'. By thus arranging the inductance-coil I am enabled to make all the connections between it and the shunt-circuit without passing any wires through the metal frame of the meter.

The armature A of the meter consists of an aluminium or copper cup mounted on the shaft 6, supported in the usual manner on a spring jewel-bearing carried by a bracket 10, extending from the meter-frame. A jam-nut 16 is arranged, as is usual, to screw up and down on the jewel-post and come in contact with a shoulder on the shaft 6 to raise it off its jewel. The top end of the shaft 6 is guided by a pin-bearing 7, supported by the bracket 8, and is provided with a worm which meshes with the worm-wheel of the registering mechanism R, also supported by the same bracket. By removing the screws 9 9 the bracket and all parts supported thereby may be removed, leaving the armature A, together with its shaft 6, free to be removed from the meter and replaced without changing any of the adjustments of the meter or affecting its accuracy in any way. The windings which are operative in driving the meter-armature are shown at $a$, $a$, $b$, and $c$. The coils $a$ $a$ are the series coils of the meter and are supported from the frame B by means of the clamp 26. These coils are mounted at an angle to each other in order to reduce the length of their magnetic circuit and also to bring them into a more effective position with respect to the shunt-coils. The shunt-coils $b$ and $c$ are supported within the armature. The coil $b$ is mounted on a laminated core $d$, the poles of which include the depending portion of the meter-armature, and this core is carried by the same clamp 26 which supports the series coils. The coil $c$ is mounted on a laminated core $e$, carried by a sleeve 13, surrounding the armature-shaft. The sleeve 13 is in turn supported by a frame 14, mounted on the bracket 10. A lever 15, clamped to the sleeve 13, furnishes a means for angularly adjusting the core $e$, together with its coil $c$, so that the fields produced by the coils $b$ and $c$ may be caused to intersect the armature at points displaced from each other by any desired angle. The coils $b$ and $c$ are connected in shunt to the mains in a manner hereinafter to be described.

A retarding-magnet M is supported from the outer end of the bracket 10, so that its poles include the depending portion of the motor-armature at a point diametrically opposite the motor-winding, so that the magnet is removed as far as possible from the influence of the motor-coils. Slots in the plate 12, to which the magnet is clamped, provide for a vertical adjustment, by means of which the retarding effect of the magnet on the armature may be varied. The above construction enables me to make a very compact meter. At the same time the parts may be quickly assembled and are readily accessible in case of trouble, and all parts which require adjustment are placed in most favorable positions. The cover or case C is made of any suitable metal pressed into the shape indicated in the drawings and riveted at the top and bottom to the castings 21 and 22, which castings are provided with means for securing the cover in place. The casting 22 at the bottom is provided with a hook-shaped projection 22', adapted to engage an opening 23 in the meter-frame. In placing the cover on the meter the hook 22' is first caused to engage with the opening 23 and then the cover is turned on the hook as a hinge until the screw 25' engages the lug 25. When closed, the edge of the cover projects into the groove 24, extending around the edge of the meter-frame, and this groove is provided with a strip of felt to insure a dust-proof fit. The meter is connected into circuit by means of wires passing through bushings 17 and 19 to the binding-posts 18 and 20, the series connections leading to the binding-posts 18 and the shunt connection being carried to the binding-post 20.

In Figs. 2 and 3 the coil $b$ is shown arranged longitudinally and inclosing only the core $d$. In Figs. 4 and 5 a different arrangement is shown, in which the coil $b$ is vertically placed, so that it incloses the core $e$, as well as the core $d$, and is in better inductive relation to the coil $c$.

Figs. 6 and 7 show still another modification in the arrangement of the shunt-coils. In this case the coil $c$ is divided into a plurality of sections $c'$ $c^2$ $c^3$. The sections $c'$ and $c^3$ surround the core $d$, as before, while the section $c^2$ surrounds both the core $e$ and the upper leg of the core $d$ and is made of sufficient width to permit the necessary adjustment of the core $e$. These several sections of the coil $c$ may be connected in series with each other and treated as one coil, or they may be connected in any other manner to produce the results desired.

In Fig. 8 I have illustrated this feature of my invention as applied to a meter of the disk type. The laminated core $d$, together with its coil $b$, is supported, as before, from the meter-frame, while the core $e$, carrying the coil $c$, is adjustable around the meter-axis. The position of the series coils is indicated in dotted lines at $a$.

In all of the modifications shown in Figs. 2 to 8, inclusive, the outer leg of the laminated core $b$ is extended in front of the armature A only sufficiently to complete its own magnetic circuit. If, however, it is desirable to render the magnetic circuit of the coil $c$ more complete, this outer leg may be extended in front of the core $d$, and such a construction is indicated in dotted lines.

In Figs. 9 to 11, inclusive, I have illustrated the construction of the core of the impedance-coil which I prefer to employ. In these figures, $f$ represents the main or external portion of the core, $g$ that portion of the core around which the coil is wound, and $i$ the clamping-plates which bind the laminations of the two cores together. The core $g$ is made shorter than the space between the opposite sides of the core $f$ in order to provide the requisite air-gap, and along the axis of the core $g$ and between it and the core $f$ I have made openings $h$, through which insulating-bolts $h'$ are passed to bind the two cores together. These holes, as before stated, are located along the axial line of the core $g$ and are therefore in a neutral position as far as the magnetic circuits are concerned. By this construction I am enabled to maintain a definite air-gap between the elements of the core by means of the same bolts which are used to clamp the elements of the core together.

By introducing a small capacity into the circuit of the shunt-coils in a manner hereinafter described I am enabled to materially reduce the amount of current required in the shunt-circuit, and in order that the introduction of such capacity may not require a separate element I have combined in one structure the inductance-coil and a condenser. Fig. 12 shows this construction, which is in general similar to that shown in Figs. 9 to 11, inclusive, but between each of the laminations of the exterior portion of the core there is introduced a sheet of dielectric $l$, and alternate laminæ are connected together at each end of the core by means of the lugs $k\ k'$, extending therefrom. The plates connected to the lugs $k$ constitute one condenser-terminal and the plates connected to the lugs $k'$ the other terminal. By means of such a construction I am enabled to combine in a compact form and in one structure both the inductance-coil and the condenser.

The shunt-coils $b$ and $c$ may be supplied with current in various ways, the only essential being that the currents supplied thereto shall have such magnitude and phase relations that the resultant of the magnetic fluxes due to the shunt-coils shall be dephased by ninety degrees from the electromotive force of the circuit to which said coils are connected. In Figs. 13 to 17, inclusive, I have illustrated diagrammatically some of the connections which may be used. These diagrams illustrate the arrangement of coils shown in Figs. 2 and 3; but it is evident that the arrangement shown in Figs. 4 to 7, inclusive, may be similarly connected.

Referring to Fig. 13, $a\ b\ c$ represent, as before, the series and shunt coils, respectively, and I the impedance-coil. As shown in this figure, the winding of the impedance-coil is divided into two sections, one of which is connected in series with the shunt-coil $b$ across the mains and the other of which supplies current through an adjustable resistance to the coil $c$. As indicated by the diagram adjacent to this figure, I am enabled by such connections to obtain two shunt magnetic fields which are so related in magnitude and phase that their resultant will be equivalent to a field displaced by ninety degrees from the field due to the series coils when the meter is operating on a non-inductive load. The winding $m$ of the inductance-coil I, connected in series with the main shunt-coil $b$, causes the current in the main shunt-coil to lag sufficiently to produce a main shunt magnetization lagging somewhat less than ninety degrees behind the electromotive force of the circuit or, what amounts to the same thing, somewhat less than ninety degrees behind the magnetization due to the series coil on non-inductive load. This main shunt magnetization may be represented in magnitude and phase by the line $p$. The winding $m'$ on the inductance-coil, acting as the secondary of a transformer and supplying current to the coil $c$, produces a magnetization which may be represented in magnitude and phase by the line $q$. The resultant of these two magnetizations is represented by the line $r$, which is displaced by ninety degrees from the line $o$, representing the phase of the magnetization of the series coil $a$ on non-inductive load.

The arrangement of Fig. 14 differs from that shown in Fig. 13 only in this respect, that the winding supplying the coil $c$ is placed in inductive relation to the main shunt-coil $b$ instead of being in inductive relation to the winding of the inductance-coil. In both of these cases it is evident that instead of using two separate windings on the core of the inductance-coil or on the main shunt-core I might connect the terminals of the coil $c$ across a portion of the turns of the inductance-coil or across a portion of the turns of the main shunt-coil, the action being substantially the same as with the arrangement shown.

As already stated, the introduction of a condenser into the shunt-circuit may be caused to materially reduce the shunt-current necessary to be taken from the line for any given magnitude of the resultant of the component shunt-fields, and in Figs. 15 to 17, inclusive, different ways of connecting in a condenser to accomplish this result are illustrated.

In Fig. 15 the connections are the same as in Fig. 14, save that a condenser $n$ is inserted in the circuit of the coil $c$. The introduction of the condenser into this circuit acts simply to advance the phase of the current beyond what it would be if the condenser were omitted, so that by using the condenser I am enabled to cause the magnetization of the coil $c$ to lag in phase behind the magnetization of the series coil $a$ by somewhat less than one hundred and eighty degrees, thereby reducing the magnitude of the main shunt magnetization necessary in order to produce a resultant field having a lag of ninety degrees. This is clearly shown in the diagram adjacent to Fig. 15, in which $p$ represents in magnitude and phase the main shunt magnetization and $q$ the magnetization produced by the auxiliary shunt-coil. Comparing this diagram with the diagrams of Figs. 13 and 14, it will be noted that although the lines $q$ are equal in length in the two diagrams the line $p$ is very materially reduced in length in the diagram in Fig. 15.

In Fig. 16 I have shown a condenser connected in a different manner to produce substantially the same results. In this figure the coils $b$ and $c$ are connected in series with each other and with the winding of the inductance-coil I across the mains, the coil $c$ being in this case shunted by the condenser. In the diagram adjacent to this figure the line *p* represents, as before, in phase and magnitude the main shunt magnetization, and hence substantially the phase and magnitude of the current in the shunt-coil *b*. The current flowing through this coil *b* divides and passes in part through the condenser and in part through the coil *c*, that portion passing through the condenser being advanced in phase, as indicated by the line *s*, and that portion passing through the coil *c* being retarded, as indicated by the line *q*. In this case also the magnitude of the main shunt magnetization necessary to produce the required resultant field is reduced.

In Fig. 17 I have shown the coil *b* connected in series with the inductance-coil I across the mains and the coil *c* also connected across the mains with a condenser included in its circuit. The connections to the coil *c* are reversed, so that while the current in the coil *c* is leading it has the same effect as a current lagging by less than one hundred and eighty degrees, as indicated in the adjacent diagram.

When the coils *b* and *c* are arranged in inductive relation to each other, as shown in Figs. 4 to 7, inclusive, or when the coil *c* is divided into sections, as shown in Figs 6 and 7, the required phase relations may be obtained in the manner already indicated in Figs. 13 to 17, inclusive, the several sections of the coil *c* in the latter case being treated as a single coil.

From the diagrams in Figs. 15 to 17, inclusive, it is apparent that by the use of a condenser in connection with the windings of the meter I am enabled to materially reduce the amount of shunt-current which is necessary to be taken from the line, and for this reason the construction which I have illustrated in Fig. 12 constitutes a valuable feature of my invention.

I have not attempted in Figs. 13 to 17, inclusive, to illustrate all the connections which might be used to produce the magnitudes and phase relations desired in my meter. These figures are merely illustrative of certain connections which may be used; but I aim to cover in the claims annexed any connections which are adapted to produce the desired effect.

What I claim as new, and desire to secure by Letters Patent of the United States, is—

1. In combination in an electric meter, a cup-shaped armature, a shaft therefor, a bracket supporting the lower bearing for said shaft, a retarding-magnet in coöperative relation with said armature, and an extension on said bracket for supporting said retarding-magnet.

2. In combination in a meter, a frame comprising a back with brackets extending therefrom, a cup-shaped armature supported between said brackets, and a retarding-magnet supported by one of said brackets, and having its poles embracing said armature.

3. In combination in a meter for alternating electric currents, a cup-shaped armature, a series coil or coils arranged adjacent to the cylindrical surface of said armature on the outside, and a plurality of relatively adjustable shunt-coils within said armature.

4. In combination in a meter for alternating electric currents, a cup-shaped armature, a series coil or coils arranged adjacent to the cylindrical surface of said armature on the outside, a plurality of relatively adjustable shunt-coils within said armature, and a retarding-magnet also in coöperative relation with said armature.

5. In combination in a meter for alternating electric currents, a cup-shaped armature, a series coil or coils arranged adjacent to the cylindrical surface of said armature on the outside, a plurality of relatively adjustable shunt-coils within said armature, and means for supplying dephased currents to said shunt-coils.

6. In an alternating-current induction meter-motor, provided with a cup-shaped armature, a plurality of relatively adjustable shunt-coils within said armature, an adjustable sleeve surrounding the armature-shaft, and an arm mounted on said sleeve for supporting one of said shunt-coils.

7. In combination in a meter for alternating electric currents, an armature, a series coil or coils, a plurality of relatively adjustable shunt-coils, means for supplying to one of said shunt-coils a current lagging behind the impressed electromotive force of the circuit, and means for producing in the other of said coils a current of such magnitude and phase that the resultant of the fields due to the two coils will lag by substantially ninety degrees behind the impressed electromotive force.

8. In combination in a meter for alternating electric currents, a cup-shaped armature, a series coil or coils arranged adjacent to the cylindrical surface of said armature on the outside, a plurality of relatively adjustable shunt-coils within said armature, means for supplying to one of said shunt-coils a current lagging behind the impressed electromotive force of the circuit, and means for producing in the other of said coils a current of such magnitude and phase that the resultant of the fields due to the two coils will lag by substantially ninety degrees behind the impressed electromotive force.

9. In combination in an electric meter, an armature, a main shunt-coil in inductive relation to said armature, and an auxiliary shunt-coil also in inductive relation to said armature, surrounded by and angularly adjustable within said main coil.

10. In combination in an electric meter, a plurality of shunt-coils, means for producing in one of said coils a current lagging less than ninety degrees behind the electromotive force impressed on the circuit, means for producing in a second coil a current lagging by more than ninety degrees behind the impressed electromotive force, and a condenser in the circuit of said second coil.

11. In combination in an electric meter, a current coil or coils, a plurality of potential coils, means for producing in each of said potential coils a current displaced in phase from the electromotive force of the circuit, and a condenser for modifying the phase of the current in one of said coils.

12. A combined impedance-coil and condenser, comprising a coil, a laminated core of magnetic material for said coil, and a dielectric medium interposed between the laminæ of said core.

13. In an inductance-coil, a plurality of laminated cores constituting a nearly-closed magnetic circuit, and non-magnetic means for clamping the laminæ of said cores together, inserted between the adjacent ends of said cores.

14. In an inductance-coil, a plurality of laminated cores constituting a nearly-closed magnetic circuit, and bolts of non-magnetic material interposed at neutral points between the adjacent portions of said cores.

15. In an inductance-coil, a plurality of cores arranged to constitute a nearly-closed magnetic circuit, and clamping-bolts of non-magnetic material interposed at neutral points between the adjacent portions of said cores.

In witness whereof I have hereunto set my hand this 15th day of January, 1900.

ELTON J. KING.

Witnesses:
HARVEY E. CRANE,
M. G. WEBBER.